UNITED STATES PATENT OFFICE 2,033,111

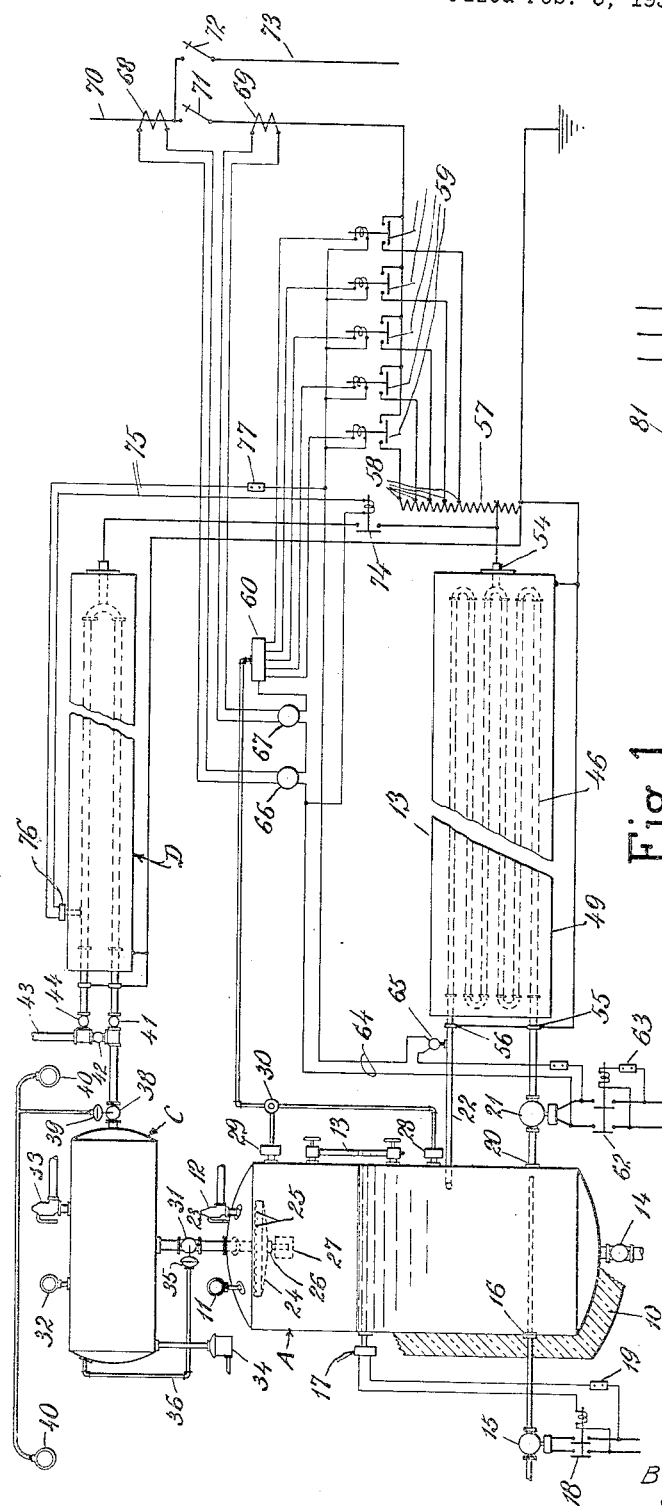

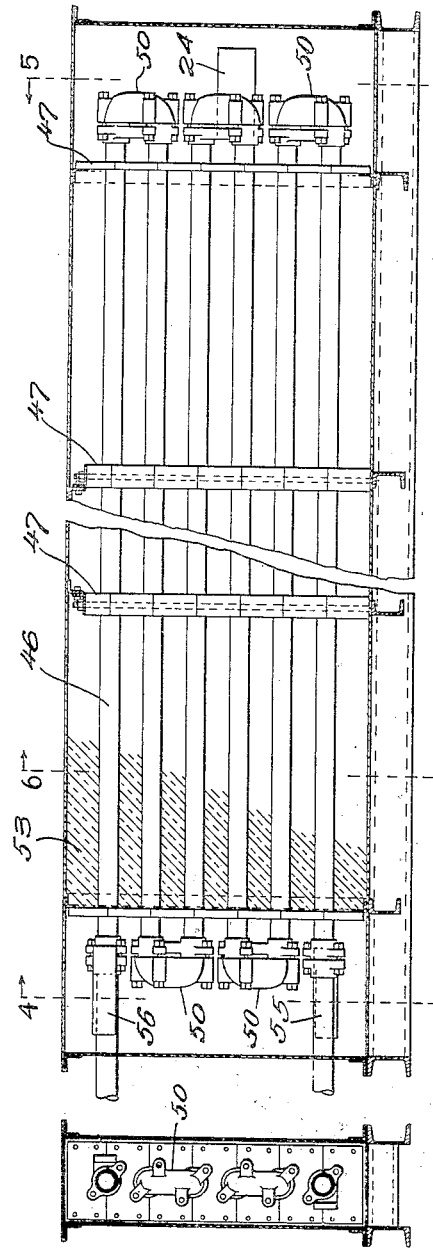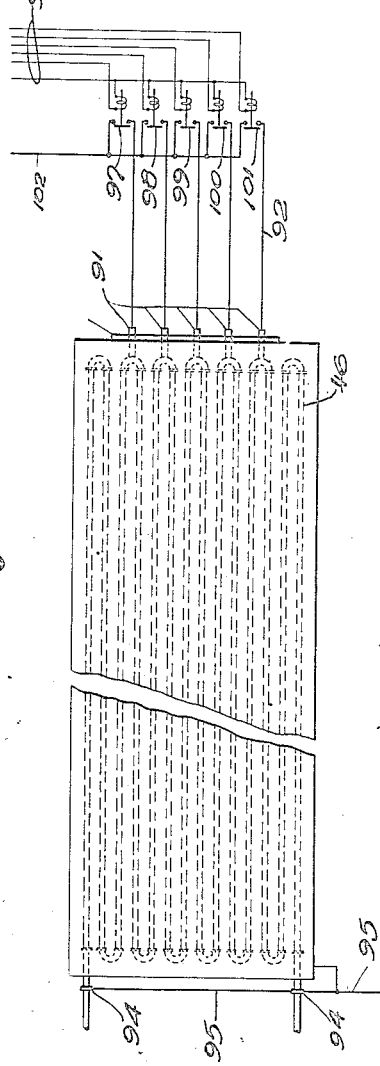

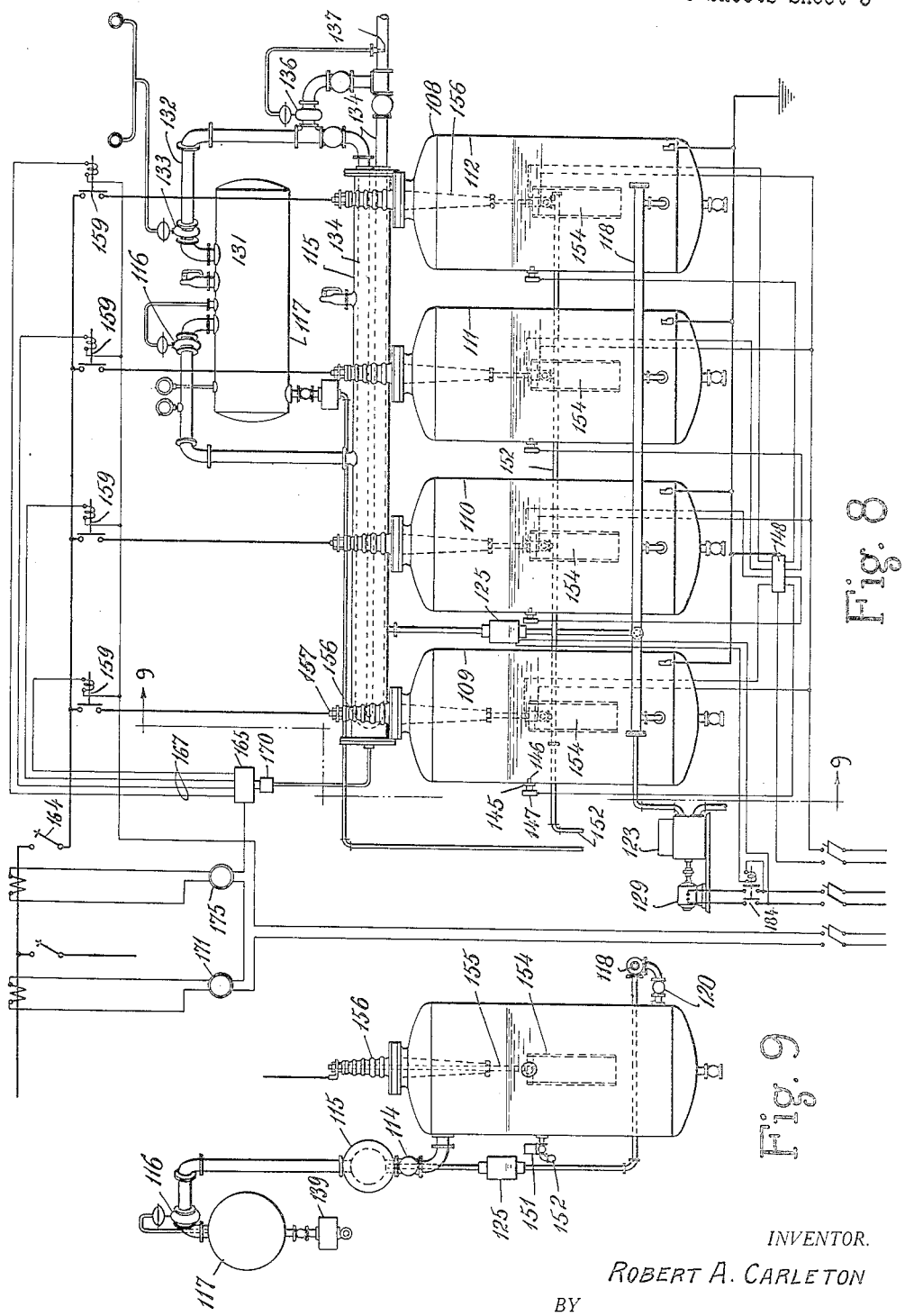

ELECTRIC STEAM HEATING APPARATUS

Robert A. Carleton, Brooklyn, N. Y., assignor to National Electric Heating Company, Inc., New York, N. Y., a corporation of New Jersey Application February 5, 1932, Serial No. 591,202

8 Claims. (Cl. 219—38)

This invention is concerned with a method of electric fluid heating and with an electric fluid heating apparatus and particularly with a method and apparatus for continuously supplying electrically heated or vaporized fluid without continually using electricity.

In many electrical power systems, the load varies from time to time, so that at some times the system is operating at full capacity while at other times, comparatively little current is being drawn. As is well known, the efficiency with which the system operates is materially reduced during these low load periods and it is therefore highly desirable to have a method and apparatus for using current during the low load periods and thus increasing the efficiency of the system during these periods. Not only will such a method and apparatus increase the efficiency but if current is not used during the peak load periods, the work done by this method and apparatus is accomplished without increasing the size of the source of current supply.

The present invention is a method and apparatus designed to supply fluid in a heated or vaporized state, continually and evenly, and to take its power from the electrical system only when a surplus of power is available and to cease to take power from the system when the other drains become heavy.

Particularly, this method and apparatus is designed for use on an electric locomotive to supply steam to heat the coaches of the train and the apparatus will be described as such, but this is only one of the many uses to which the invention may be put; it being equally useful in stationary steam generation and for carrying out many chemical processes such as evaporation, concentration and the like. It has many useful applications in the chemical industries, as in the evaporation of waste liquors, the treatment of wood pulp and the like and in the evaporation of liquids requiring high temperatures, such as caustics and other chemical compounds which may be caused to flow in a fluid condition by high temperatures.

As used on an electric locomotive, the apparatus comprises a steam generator consisting of one or more tanks in which the liquid being heated is stored. The fluid may either be electrically heated inside these tanks or it may be heated by circulating it through electrically heated coils attached to the tanks. When the apparatus is in operation, these tanks are at a high pressure and temperature so that a considerable amount of heat is stored up in them. The amount of this stored heat is brought to a predetermined maximum while there is a surplus of power in the electrical system, which may be used for this purpose; and when power is needed at other parts of the system, the heater is switched off but continues to supply heated or vaporized fluid by using the excess heat stored in the fluid in the tanks.

Means are provided for reducing the pressure of the fluid vapor from the generator to a predetermined pressure and means are also provided for superheating the vapor after the pressure is reduced so that it will be dry and will not deposit liquid in the pipes by which it is conveyed to the place where it is used.

Control devices are provided which make the operation of the apparatus automatic and the apparatus is simply arranged, rugged in construction and compact in size. As arranged, it is economical to construct and operate and may be made for use with any kind of electric current or in any size.

These and other features will appear more fully from the following description and the accompanying drawings, and will be particularly pointed out in the claims.

Preferred forms of apparatus embodying the invention as applied to electrical train heating are illustrated in the accompanying drawings, in which Figure 1 is a schematic view of an arrangement for generating steam employing a single phase electric heating circuit.

Figure 2 is a sectional elevation of another form of electric fluid heater, employing a three phase electric heating circuit.

Figure 3 is a sectional elevation of the electric fluid heater, shown in Figure 1.

Figure 4 is a sectional end elevation on line 4—4 of Figure 3 of the electric fluid heater.

Figure 5 is a sectional end elevation on line 5—5 of Figure 3 of the heater.

Figure 6 is a sectional elevation on line 6—6 of Figure 3 of the heater.

Figure 7 is an elevation of the heater showing the wiring connections when the heater is used with direct current.

Figure 8 is a schematic view of an arrangement of the electric heater suitable for use with high voltages.

Figure 9 is a sectional view of the apparatus shown in Fig. 8 taken on the line 9—9.

On many wholly or partially electrified railroad systems now in operation, the coaches and Pullman cars are equipped with pipe coils or radiators for heating by steam, the necessary boiler for supplying the steam being located on the electric locomotive, where the steam is generated by means of oil or coal fires. The amount of steam required for heating the cars is considerable, for instance, a recent test on one of the large railroad systems indicates that in cold weather an express train will require from 5000 to 6000 lbs. of steam at 200 lbs. pressure per hour to heat the cars. This is equivalent to 1600 to 1800 kw. of electricity per hour.

The arrangement as shown in Figure 1 of the drawings is the preferred embodiment of this invention as used to supply steam for heating railroad trains. The apparatus comprises a boiler A which holds the water and steam; a heater B which heats the water from the boiler and returns it thereto; an expander C in which the steam from the boiler A is expanded to the pressure at which it is to be supplied to the radiators in the cars; and a superheater D which may be used to superheat the steam before it is supplied to the radiators so that the losses due to condensation will be reduced.

The boiler

The boiler A is of the usual type, constructed of steel plates or the like. As shown, it is insulated by heat insulation 10 and has a pressure gauge 11, a safety valve 12, a gauge glass 13, and a blow-off connection 14, all of the usual type. Water is supplied to the boiler by a pump 15 through a pipe 16 which extends into the boiler. The operation of the feedwater pump 15 is controlled by a switch 17 which is operated by the water level in the boiler. The switch 17 operates through a relay 18 to control the current supplied to the motor which operates the pump 15. A pushbutton 19 is in series with the switch 17 and serves to operate the relay 18 to stop the pump 15 when it is desired to stop the supply of feedwater for any reason, as for instance when the boiler A is being drained.

The heater B is connected to the boiler A by an outlet pipe 20 through which water is circulated to the heater B by the pump 21 and by an inlet pipe 22 through which the hot water or steam is returned to the boiler from the heater. The outlet pipe 20 is located adjacent the end of the feedpipe 16 so that it takes the incoming feedwater directly into the heater, thus tending to minimize the local temperature variations within the boiler A. The inlet pipe 22, by which the water or steam is returned to the boiler from the heater, enters the boiler in a tangential direction and thus causes a stirring action within the boiler which tends to mix incoming water and steam with the water already in the boiler and thereby keep an even temperature throughout the boiler and also facilitates the separation of the steam from the water and tends to prevent the entrainment of water in the steam as it separates.

Sufficient steam space is provided in the boiler above the liquid level to permit the entrained water to separate from the steam and an outlet pipe 23 is provided at the top of the boiler for the removal of the relatively dry steam. On the lower end of the outlet pipe 23 within the boiler A is a circular pipe 24 provided with openings 25 and connected to the outlet pipe 23. The steam enters these openings 25, passes through the circular pipe into the outlet pipe 23. The total area of the openings 25 is slightly less than the area of the opening in the outlet pipe 23, thus creating a slight drop in pressure and causing any entrained water to be vaporized so that the steam is relatively dry as it passes through the outlet.

A drain is provided for any water which may collect in the outlet pipe by a pipe 26 connected to the lower end of the pipe 23 and extending into a cup 27 suspended below it and normally filled with water. The cup 27 forms a trap to prevent the steam from passing upward through the pipe 26.

A thermostat 28 and a pressure responsive device 29 are located upon the boiler so as to be subject to the temperature of the water and the pressure of the steam respectively and are connected to a junction box 30 through which they operate to control the action of the heater B as will be later described.

The heater

The heater B comprises a plurality of heater tubes 46 having walls of a relatively high resistance metal such as Monel, chrome nickel alloy, or other suitable metal, closely spaced and in substantial parallelism, and supported by means of electric insulating members 47 within a steel casing 49. Return bend fittings 50 are provided, connecting the alternate adjacent ends of heater tubes 46 and thereby provide a sinuous conduit from the inlet to the outlet of the heater. The space between the heater tubes 46 and the casing 49 is substantially filled with a suitable heat and electrical insulating material 53 to reduce the loss of heat by radiation.

When the device operates on single phase alternating current, as in Figures 1 and 3, an electric terminal 54 is welded or otherwise electrically connected to one of the return bend fittings 50 near the center of the heater and electric terminals 55 and 56 are welded or otherwise electrically connected to the heater tubes 46 where they enter and leave the heater.

The electric terminals 55 and 56 and the steel casing 49 are all electrically connected to the ground so that there is no danger of short circuits or of anyone receiving a shock by touching the inlet or outlet pipes or the casing. The center connection 54 is connected to one terminal on an autotransformer 57, one side of which is grounded, and the other side of which has a plurality of connections 58 through which it may be selectively connected to a source of electric current, to vary the amount of current passed through the heater. The connections 58 are selectively connected to the incoming power line by means of magnetic switches 59, which are in turn operated by a controller 60 which is actuated by the pyrometer 28 or the pressure responsive device 29 through the junction box 30.

By thus connecting the heater tubes 46, the electric heating current is caused to flow in opposite directions through adjacent tubes, thereby substantially neutralizing the self-inductive effect of the relatively large heating currents enabling the circuit to operate at a high power factor and the casing and outlet ends of the heater tubes are at ground potential so that there is no danger of short circuits or the like.

The water circulating pump 21 is motor driven, and the capacity thereof is such that the volume of water circulated through electric fluid heater B keeps the fluid flowing in heater tubes 46 substantially in liquid form, the weight of steam in the fluid passing from heater B not exceeding 20%, thus maintaining efficient heat transfer conditions, eliminating the possibility of coating or scale formation on inside of heater tubes 46, and permitting the regular and orderly separation of the steam in a relatively dry form from the water in boiler A. The motor for pump 21 is supplied with current from any suitable source through a switch 62 which is illustrated as magnetically operated by a pushbutton 63.

The volume of water maintained in boiler A is such that the heat contained therein is sufficient to supply steam at a slightly lower pressure for a considerable period of time in the event the electric heating current is disconnected from the electric fluid heater 15 for a short period of time, such as for instance, while the train is starting up or accelerating, for during such time relatively large amounts of electric power are required, and it is desirable to disconnect the electric heating load temporarily.

The controller 60 acts to control the magnetic switches 59 by means of an electrical circuit 64 which receives current from the same source as the motor for the feed pump 21. Only when the current is supplied to the feed pump is it supplied to the circuit 64 and only then can the controller 60 close one of the magnetic switches 59 to supply current to the heater. Thus, if the feed pump is stopped on account of the current to it being stopped, the heater can not be supplied with current.

As a further precaution a switch 65, held closed by the flow of fluid in the return pipe from the heater to the boiler, is placed in the circuit 64 and breaks this circuit if the fluid for any reason ceases to flow.

Also in the circuit 64 are placed two automatic switches 66 and 67 either one of which may operate to break the circuit and cut off the supply of current to the heater. The switch 66 is operated from a power transformer 68 which is energized by the incoming current from the trolley or pantograph or third rail when the device is used in an electric locomotive and operates when the power drawn reaches a predetermined maximum to open the switch 66 and cut off the supply of current to the electric heater B. Thus when a peak load is being drawn from the system as when the locomotive is starting or pulling a steep grade, the supply of current to the heater is stopped. The switch 67 is operated by a power transformer 69 connected to the wire which supplies current to the electric heater B so that if the heater B draws excessive current, it will be disconnected. The heater B is connected to the conductor 70 which leads to the trolley or third rail by a switch 71 and the locomotive takes its power from the conductor 70 through a switch 72 and a conductor 73.

In operation the water flowing through the conduit comprising heater tubes 46 is quickly heated by direct contact with the high resistance walls of the tubes through which the electric heating current is passing, the mixture of water and vapor passing to boiler A from which the steam is withdrawn and the water recirculated for further heating.

By reason of the relatively high velocity or rate of liquid flow through the heater tubes 46, the heat generated in the tube walls by the electric current is quickly absorbed by the water, resulting in a low temperature differential between the tube walls and the liquid, thus making it practical to employ relatively large rates of energy or heat input per unit area of heating surface.

For example, in practical operation using a heater of the character described, electric energy or heat input on the basis of 80,000 B. t. u.'s per square foot of heating surface per hour is employed. In oil or coal fired steam generating equipment used for this purpose, heat inputs of 13,000 B. t. u.'s per square foot of heating surface per hour are rarely exceeded. When using the usual electric immersion units, heat inputs on the basis of 7500 B. t. u.'s per square foot per hour are usual.

Due to the cooling effect of the water flowing rapidly through the heater tubes, the walls of which comprise the electric heating elements, they operate at a relatively low temperature and there is no possibility of burn-out or electrical failure, and as they are constructed of non-corrosive metal, designed to resist the operating pressure, they are practically indestructible, thereby eliminating or reducing the maintenance or replacement expense to the lowest possible amount.

The expander

From the boiler A the steam passes through the outlet pipe 23 and valve 31 to the expander C which is shown as an expansion tank. This tank is constructed of steel plates and connected thereto is a pressure gauge 32, a safety valve 33 and a trap 34 through which water may be removed. The valve 31 is controlled by a pressure responsive device 35 which is controlled by the pressure within the expansion tank C through a pipe 36 so that the pressure within the expansion tank C is always maintained at a predetermined pressure.

The superheater

From the expander C the steam passes through the valve 38 to the superheater D. The valve 38 is controlled by a device 39 which is in turn controlled by two or more thermostats 40. The thermostats 40 are preferably located one on either side of the engine cab and the temperature recorded by these thermostats is averaged by the device 39 and the valve 38 operated accordingly, so that the amount of steam supplied to the radiators in the cars is controlled in accordance with the temperature conditions existing outside the cab.

While the control of the valve 38 is described as depending upon thermostats, it is obvious it may also be made to depend wholly or in part upon other conditions such as wind, humidity, and the like, by using the proper instruments and connecting them so that they will effect the operation of the valve 38.

From the valve 38 the steam passes through a T-connection to the valve 41 or the valve 42. Valves 41, 42 and 44 connected to inlet and outlet of superheater provide means by which the steam may selectively be passed through superheater to steam main 43 or passed directly from the expander C to the steam main without passing through the superheater. Steam passing through the valve 41 enters the superheater D while steam passing through the valve 42 is by-passed around the superheater and passes through a second T-connection and the pipe 43 leading to the radiators in the cars. The valve 44 is also connected to the second T-connection and the steam from the superheater returns through this valve to the pipe 43 which leads to the radiators.

The heater B and the superheater D are similarly constructed except that the superheater is usually a somewhat smaller unit.

The superheater D is connected in parallel with the heater B through a magnetically operated switch 74 which is operated by current taken from the control circuit 64 by the superheater control circuit 75. A thermostat 76 and a pushbutton switch 77 are connected in series with the magnetic switch 74 to form the circuit 75 and the magnetic switch 74 may be controlled either by the thermostat 76 or the pushbutton switch 77. The thermostat 76 is located so as to be subject to the temperature of the steam as it leaves the superheater.

When transmitting the steam to the cars near the end of long trains, with the usual steam heating systems, the loss of heat by radiation from the pipes under the cars and the hose connections between them cause a considerable amount of the steam to be condensed, the condensate being trapped and discharged to the roadbed. In cold weather this condensate may amount to 20% or more of the steam required for heating the cars and represents a substantial loss of the steam generated and required for car heating, and makes it necessary to carry a greater supply of water for steam generation.

To overcome this difficulty, the present invention proposes to superheat the steam to substantially prevent condensation in the steam transmission system and deliver it in a relatively dry condition to the cars, where it will give up its energy in the form of heat in the radiators. It is for this purpose that electric steam superheater D is provided, through which the steam from the boiler passes before passing to the cars.

It will be observed that by reason of the superheater being electrically connected in parallel to the heater B the amount of electric heat supplied the heater tubes is subject to the voltage supplied electric heater B, and is therefore proportional to that required to generate the steam and to maintain its pressure in the boiler and it is therefore substantially proportional to the amount of steam flowing through superheater and thus acts to superheat the steam to a relatively constant temperature regardless of the quantity of steam withdrawn.

Operation

In the operation of electric railway systems, particularly those on which the traffic is of an interurban nature, the heaviest traffic, requiring the greatest demand for power usually occurs during the hours of 8 and 9 in the morning and between 4:45 and 5:45 in the evening, during which period the electric power requirements for train operation may utilize the full capacity of the power generating and transmitting system and although it is necessary to heat the cars during these periods, the operation of the electric steam generating equipment would overtax the capacity of the electric power system.

Under the above conditions the fluid in boiler A is maintained at a high pressure, for example, 800 to 1000# per square inch, the steam passing from outlet by way of pressure reducing device to expansion tank C to which it is supplied at a suitable low pressure, for example, 100 to 200# per square inch, the water contained in boiler A being of such volume that the stored heat will produce sufficient steam at the lower pressure to supply the steam heating requirements for a period of time, which may be an hour or more, and avoid the necessity of using the electric power for electric heating purposes during high power demand periods.

In operation, the steam generating system is brought up to full pressure before the peak demand of the electric power occurs and is then disconnected from the electric power system or the electric power input reduced to a suitable low value, the low pressure steam system then operating from the heat stored in the high pressure system, thus permitting the operation of the electric heating load during low power demand or off-peak period, under which condition the electric power used for steam generation tends to smooth out the fluctuations of the total power drawn from the system and the electric current used for heating is of the so-called off-peak nature and obtainable at the lowest cost.

The boiler A may be operated either at high or low pressure as desired by adjusting the control thermostat 28 and/or the control pressure device 29 and may supply steam at practically the pressure it is to be used or at a much higher pressure as desired.

The foregoing description has been mainly of the system and the heater may take a number of different forms depending upon the space available, the size of the unit and the power to be used. In small units the heater may even be located inside of the boiler. Furthermore, the expander C may take a different form and in some cases need only be a valve with no expansion tank and the superheater may be placed on either side of the expander if desired.

3-Phase heater

One modification of the heater is shown by the construction illustrated in Figure 2 which is an arrangement of an electric fluid heater, similar to that shown in Figure 1, except that the electric heating circuits are arranged for operation on a 3-phase electric power system.

As illustrated, the return bend fittings connecting the ends of heater tubes 46 are provided with electric terminals 80 connected to terminals 81 of electric transformer 82.

The opposite ends of heater tubes 46 are also provided with return bend fittings having electric terminals 83 connected to ground and the outer enclosing case of heater is also grounded, thereby maintaining inlet and outlet of heater and its enclosing casing, at ground potential.

Transformer 82 is provided with taps or connections 85 connected to magnetic switches 86, operable selectively by means of control wires 87, from pressure controlling device 29, or from thermostatic device 28 and also subject to the automatic features of control circuit 64, as already described in connection with the arrangement shown in Fig. 1.

Direct current heater

The construction shown in Figure 7 illustrates the arrangement of an electric fluid heater, similar to that shown in Figure 1, except that the electric heating circuits are arranged for operation on a direct current electric power system.

As illustrated, certain of the return bend fittings connecting the ends of heater tubes 46 are provided with electric terminals 91 and connect by means of electric conductors 92 to magnetic switches 97 to 101, which in turn are connected by means of electric conductor 102 to the trolley or third rail of the electric power system.

Inlet and outlet of this heater are provided with electric terminals 94, connecting by means of electric conductor 95 to the track or ground return of the power system.

The magnetic switches are automatically operable by means of control wires 96, in a manner similar to that already described.

It will be observed, that while the input of electric heating current in the arrangement shown in Figs. 1 and 2 is controlled by means of varying the voltage of the circuit supplying heater tubes 46 by changing the stepdown transformer connections, the variation in the heating current supplied heater tubes 46 obtained in the arrangement shown in Fig. 7 is by changing the effective resistance of the circuit comprising the heater tubes 46, by varying the point of application of the heating current.

For example, when magnetic switch 99 is closed, the full resistance of heater tubes 46 is in circuit, causing the minimum heating current to flow, whereas when magnetic switches 97 and 101 are closed, the electric heating current passes through but a portion of the heater tubes but at an increased rate due to the reduced electrical resistance of the circuit. Thus, with the arrangement illustrated, using 5 magnetic switches, the total heat input to the heater tubes 46 may be automatically varied from full capacity, to approximately 30% or less of full capacity.

Modification for high voltage

The arrangement of apparatus for generating steam, illustrated in Figures 1 to 7, is suitable for use with any alternating electric current system where the high trolley voltage may be reduced by means of transformers to one suitable for use with the tubular heaters illustrated, or with direct current electric distributing systems of relatively low voltage, which may be applied directly to the electric heater, but for use with electric systems employing high voltage direct current, for example voltages above 1100 and which in some instances may exceed 5000 volts, the tubular type of heater described would not be suitable, due to the relatively high electric resistance required in the tubes and the expense and difficulty of properly insulating it for the high voltage involved. Also for use with high voltage alternating current systems, while a step down transformer may be utilized to reduce the line voltage suitably for use, the space requirements, weight and cost of the transformer are objectionable.

Therefore, for use with high voltage direct or alternating current electric distributing systems I prefer to employ an electric steam boiler of the so-called "electrode" type in which electrodes connected to the electric power system are immersed in water contained in a suitable receptacle, the water being heated and vaporized by the heat generated due to its resistance to the flow of the electric current therethrough.

The arrangement of apparatus for heating water and generating steam at high pressure, illustrated in Figures 8 and 9, comprises a plurality of boilers of the electrode type, each comprising a receptacle (108) of steel or other suitable metal designed to withstand the relatively high pressure and temperature to which they are to be subjected. While one boiler of suitable capacity may be employed it is preferable to employ a plurality of such, each being of relatively small diameter, thereby reducing surging of the water in the boiler due to the swaying and sudden stopping and starting of the locomotive.

Boilers and heaters

Each of the boilers 109, 110, 111 and 112 is heated by an electrical current which passes from an electrode 154 suspended in the center thereof to the shell of the boiler. Each boiler shell is connected to the ground and each electrode 154 is suspended in its boiler by a conducting rod 155 which passes through an insulator 156 fixed in the top of the boiler. Water is supplied to the boilers by a pump 123 driven by a motor 129 through a feed water header 118 which is connected to each of the boilers through a check valve 120 which prevents any return flow to the header.

The feed water pump is operated automatically by means of a magnetic switch in the line which supplies electric current to the motor 129. This switch is operated by a feed water regulating device 125 connected between the feed water header 118 and the steam header 115. This regulating device merely contains a float operated switch and need not be described in detail.

This modification also provides a means for discharging from the boiler a part of the liquid contained therein when this liquid becomes so saturated with salts that it is too highly conductive. Such a saturation of salts is bound to occur because the water is continually boiled off while the salts contained therein remain in the boiler. The water is removed from the boilers through magnetically operated valves 151 which discharge into a drain pipe 152.

Control system

The valves 151 are operated by a controller 148 which in turn is operated in accordance with the conductivity of the liquid within each of the boilers. Means for so operating the controller 148 comprise an insulator 145 extending through the side of each boiler below the water line and having a conductor 146 extending therethrough and contacting with the water in the boiler at a fixed distance from the side of the boiler. The controller 148 is connected to each of the conductors 146 and is also grounded and thereby connected to the shell of the boilers. The controller then contains mechanism operable to measure the resistance of the water between the conductor and the side of the boiler and to operate the magnetic valves 151 and discharge a fixed amount of water from any one of the boilers whenever the conductivity of the water in that boiler becomes too low.

The remainder of the automatic control system which operates this apparatus is quite similar to the control system used in connection with the apparatus already described. As already stated, the shells of the boilers are all grounded and the electrodes in the boilers are suspended on conducting rods 155 passing through insulators 156. Each of the conducting rods 155 is connected through a magnetic switch 159 to a trunk line which is in turn connected through a manually operated switch 164 to one side of the main power line. The other side of the main power supply line is grounded. Thus the operation of the magnetic switches 159 control the supply of current to the boilers. These magnetic switches 159 are controlled by a controller 165 operated by a pressure responsive device 170 actuated by the pressure in the header 115. Cut-out switches 171 and 175 are in the circuit with the controller 165 and the magnetic switches 159, and either of these cut-out switches may break the circuit and open all the switches 159, thus stopping the supply of current to the boilers. The switch 171 is operated when large amounts of current pass through the main power supply line, and switch 175 is operated when excessive current is drawn by the heating apparatus. This is similar to the operation of the switches 66 and 67 in Fig. 1.

Expander

The steam from the boilers is collected by a steam header 115 connected to each of the boilers through a check valve 114, and passes from the steam header 115 through a pressure reducing valve 116 into an expander 117 similar to the expander already described. From the expander, steam passes out through a regulating valve 133 either to a superheater or to the place where it is to be used.

Superheater

The superheater as illustrated in Fig. 8 comprises a U-shaped pipe 134 extending into the header 115. As the steam in the header 115 has not yet been expanded, it is at a much higher temperature than the expanded steam and hence serves to superheat the expanded steam.

Another difference between this modification and the modifications already described is an automatic valve 136 which controls the amount of steam which is by-passed around the superheater 134. The valve 136 is operated by a thermostatic element 137 so that it keeps the temperature of the steam which leaves the heater constant.

I claim:

1. In combination with an electric power system operating under varying load, an electrical heating apparatus, electrical connections between said system and apparatus, a closed container of liquid heated by said apparatus to a high vaporizing temperature and pressure of the liquid, means responsive to a low power demand of the system for controlling said connections, means for withdrawing the high pressure vapor from the container to reduce the pressure therein for permitting progressively further vaporization of the liquid therein at lower pressures, and means for utilizing the vapor so withdrawn during periods when the apparatus is disconnected from the system.

2. An electric steam generating apparatus comprising a closed receptacle for the fluid, an electric fluid heater comprising a plurality of heater tubes having metallic walls of high electrical resistance, means for connecting the alternate adjacent ends of said heater tubes to form a continuous sinuous conduit, means for causing an electric heating current to pass through said high resistance walls, means for supplying liquid to said receptacle, means for causing the liquid in said receptacle to circulate through said heater tubes whereby said liquid will be heated by direct contact with the walls thereof, automatic means subjected to the pressure of the vapors in said receptacle operable to regulate the electric heating current supplied said heater tubes to maintain said pressure at a determinate degree, automatic means subjected to the flow of the fluid through said heater tubes operable to cause the electric heating current to be supplied said heater tubes and to prevent supply of said current upon substantial cessation of said flow, and means for drying and for removing the vapors from said receptacle.

3. An electric steam generating apparatus comprising a closed receptacle for the fluid, an electric fluid heater comprising a plurality of heater tubes having metallic walls of high electrical resistance closely spaced apart and arranged in substantial parallelism, means for connecting the alternate adjacent ends of said heater tubes to form a continuous sinuous conduit, means to cause the electric heating current to pass through the high resistance walls of adjacent heater tubes in opposite directions whereby the effects of self-induction will be substantially neutralized, means for maintaining the ends of said sinuous conduit at the same electrical and ground potential, means for supplying liquid to said receptacle, automatic means subjected to the height of liquid in said receptacle operable to regulate the amount of liquid supplied said receptacle, means for causing the liquid in said receptacle to circulate through said heater tubes whereby said liquid will be heated by direct contact with the walls thereof, means for drying and for removing the vapors from said receptacle, and electrical heating means operable to superheat the vapors discharged from said receptacle.

4. An electric steam generating apparatus comprising a closed receptacle for the fluid, an electric fluid heater comprising a plurality of heater tubes having metallic walls of high electrical resistance closely spaced apart and arranged in substantial parallelism, means for connecting the alternate adjacent ends of said heater tubes to form a continuous sinuous conduit, means to cause the electric heating current to pass through the high resistance walls of adjacent heater tubes in opposite directions whereby the effects of self-induction will be substantially neutralized, means for maintaining the ends of said sinuous conduit at the same electrical and ground potential, means for supplying liquid to said receptacle, automatic means subjected to the height of liquid in said receptacle operable to regulate the amount of liquid supplied said receptacle, means for causing the liquid in said receptacle to circulate through said heater tubes whereby said liquid will be heated by direct contact with the walls thereof, automatic means subjected to the temperature of the liquid in said receptacle operable to regulate the electric heating current supplied said heater tubes to maintain said liquid at a determinate degree of heat, means for drying and for removing the vapors from said receptacle, and electrical heating means operable to superheat the vapors discharged from said receptacle.

5. An electric steam generating apparatus comprising a closed receptacle for the fluid, an electric fluid heater comprising a plurality of heater tubes having metallic walls of high electrical resistance closely spaced apart and arranged in substantial parallelism, means for connecting the alternate adjacent ends of said heater tubes to form a continuous sinuous conduit, means to cause the electric heating current to pass through the high resistance walls of adjacent heater tubes in opposite directions whereby the effects of self-induction will be substantially neutralized, means for maintaining the ends of said sinuous conduit at the same electrical and ground potential, means for supplying liquid to said receptacle, automatic means subjected to the height of liquid in said receptacle operable to regulate the amount of liquid supplied said receptacle, means for causing the liquid in said receptacle to circulate through said heater tubes whereby said liquid will be heated by direct contact with the walls thereof, automatic means subjected to the pressure of the vapors in said receptacle operable to regulate the electric heating current supplied said heater tubes to maintain said pressure at a determinate degree, automatic means subjected to the flow of the fluid through said heater tubes operable to cause the electric heating current to be supplied said heater tubes and to prevent supply of said automatic means subjected to the influence of the total electric current supplied a selected plurality of electric consuming devices operable to cause the electric heating current to be supplied said heater tubes and to prevent the supply of said heating current when said total electric currents exceeds a predetermined degree, means for drying and for removing the vapors from said receptacle, and electrical heating means operable to superheat the vapors discharged from said receptacle.

6. An electric steam generating apparatus comprising a closed receptacle for the fluid, an expansion tank communicating therewith, automatic means subjected to the pressure in said expansion tank to cause the fluid to flow thereto, an electric fluid heater comprising a plurality of heater tubes having metallic walls of high electrical resistance, means for connecting the alternate adjacent ends of said heater tubes to form a continuous sinuous conduit, means for causing an electric heating current to pass through said high resistance walls, means for supplying liquid to said receptacle, means for causing the liquid in said receptacle to circulate through said heater tubes whereby said liquid will be heated by direct contact with the walls thereof, and means for removing vapors from said expansion chamber.

7. An electric steam generating apparatus comprising a closed receptacle for the fluid, an expansion tank communicating therewith, automatic means subjected to the pressure in said expansion tank to cause the fluid to flow thereto, an electric fluid heater comprising a plurality of heater tubes having metallic walls of high electrical resistance closely spaced apart and arranged in substantial parallelism, means for connecting the alternate adjacent ends of said heater tubes to form a continuous sinuous conduit, means for causing an electric heating current to pass through said high resistance walls, means for maintaining the ends of said sinuous conduit at the same electrical and ground potential, means for supplying liquid to said receptacle, automatic means subjected to the height of liquid in said receptacle operable to regulate the amount of liquid supplied said receptacle, means for causing the liquid in said receptacle to circulate through said heater tubes whereby said liquid will be heated by direct contact with the walls thereof, automatic means subjected to the pressure of the vapors in said receptacle operable to regulate the electric heating current supplied said heater tubes to maintain said pressure at a determinate degree, automatic means subjected to the flow of the fluid through said heater tubes operable to cause the electric heating current to be supplied said heater tubes and to prevent supply of said current upon substantial cessation of said flow, automatic means subjected to atmospheric conditions operable to control the flow of vapor from said expansion chamber, electrical heating means operable to superheat the vapors discharged from said expansion chamber.

8. An electric steam generating apparatus comprising a closed receptacle for the fluid, an expansion tank communicating therewith, automatic means subjected to the pressure in said expansion tank to cause the fluid to flow thereto, an electric fluid heater comprising a plurality of heater tubes having metallic walls of high electrical resistance closely spaced apart and arranged in substantial parallelism, means for connecting the alternate adjacent ends of said heater tubes to form a continuous sinuous conduit, means for causing an electric heating current to pass through said high resistance walls, means to cause the electric heating current to pass through the high resistance walls of adjacent heater tubes in opposite directions whereby the effects of self-induction will be substantially neutralized, means for maintaining the ends of said sinuous conduit at the same electrical and ground potential, means for supplying liquid to said receptacle, automatic means subjected to the height of liquid in said receptacle operable to regulate the amount of liquid supplied said receptacle, means for causing the liquid in said receptacle to circulate through said heater tubes whereby said liquid will be heated by direct contact with the walls thereof, automatic means subjected to the temperature of the liquid in said receptacle operable to regulate the electric heating current supplied said heater tubes to maintain said liquid at a determinate degree of heat, automatic means subjected to the flow of the fluid through said heater tubes operable to cause the electric heating current to be supplied said heater tubes and to prevent supply of said current upon substantial cessation of said flow, automatic means subjected to the influence of the total electric current supplied a selected plurality of electric consuming devices operable to cause the electric heating current to be supplied said heater tubes and to prevent the supply of said heating current when said total electric current exceeds a predetermined degree, electrical heating means operable to superheat the vapors discharged from said expansion chamber.

ROBERT A. CARLETON.